Feb. 15, 1938. H. W. LEVERENZ 2,108,683
METHOD OF MAKING FLUORESCENT SCREENS
Filed May 23, 1934
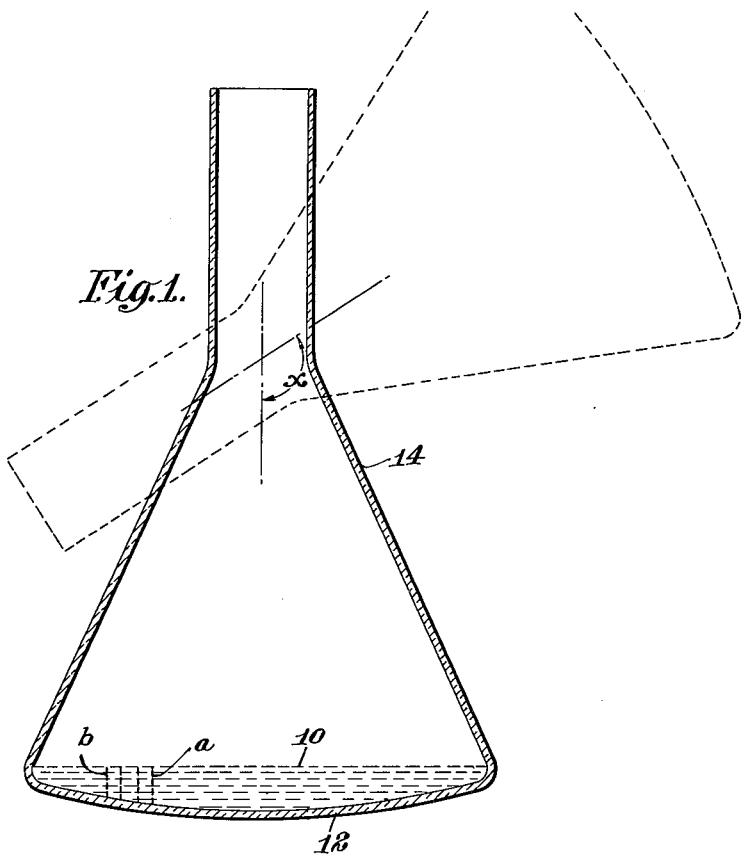
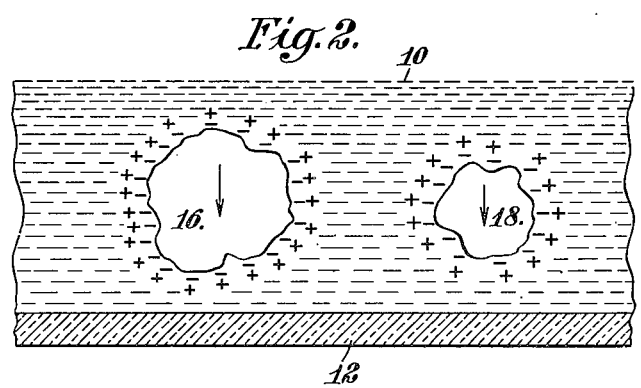
INVENTOR:
Humboldt W. Leverenz,
BY R Goldsborough
ATTORNEY.

Patented Feb. 15, 1938

2,108,683

UNITED STATES PATENT OFFICE 2,108,683

METHOD OF MAKING FLUORESCENT SCREENS

Humboldt W. Leverenz, Collingswood, N. J., assignor to Radio Corporation of America, a corporation of Delaware Application May 23, 1934, Serial No. 727,134

8 Claims. (Cl. 91—68)

My invention relates to improvements in methods of and means for making fluorescent screens.

For the purpose of television reception with a cathode ray tube having a fluorescent screen which is scanned by the cathode ray, and on which an image of the transmitted object is produced, it is important that the screen be uniform and have a light efficiency sufficient for the picture to be seen without eye-strain.

Fluorescent screens of the character referred to have been made heretofore by grinding fluorescent material such as willemite $$(Zn_2SiO_4BaMn)$$

to a size such that the particles will pass through a 270 mesh screen. These particles were placed in suspension in a settling liquid, and the combination placed into an upright tube blank for the cathode ray tube, covering just the surface of the end wall to a small depth. The particles of the fluorescent material were allowed to settle on the end wall of the tube, after which the tube was rotated slowly about a horizontal axis to decant the supernatant liquid. In this way, a uniform fluorescent screen was left on the end wall of the tube, the individual particles of the material interlocking with each other and adhering firmly to the glass surface without, necessarily, use of a binder.

While the screens made in the manner aforesaid are satisfactory to some degree, the light efficiency thereof is not as high as is desirable, and in any event is not sufficiently high for use in the so-called projection receiver tubes in the use of which the image on the screen is projected by a lens system onto a larger external screen for observation.

Furthermore, in this prior method of making the screens, the water or other settling fluid used has a relatively high viscosity constant. During decanting of the supernatant liquid, therefore, the frictional force upon the settled screen has a tendency to dislodge or rearrange some of the particles to thereby destroy the desired uniformity. Furthermore, the surface tension of the settling fluid used in this prior method is relatively low, which prevents the surface of the liquid from being as pure as possible. This condition causes an undesirable degree of "wetting" and other adsorption phenomena during settling and subsequent decanting of the supernatant liquid.

In connection with my invention, and for the purpose of making a fluorescent screen with a light efficiency substantially greater than the light efficiency of those made by the method referred to above, I proposed, first, to make the particles of the fluorescent material much finer than had been done before, the size proposed, for example, being of the order of the size of particles which will pass through a 400 mesh screen. By doing this, it was found that the light efficiency of the screen was increased substantially three-fold. However, there was a very serious defect in these screens made with the finer particles since there were substantial irregularities over the surface. These irregularities were sufficiently great to make the screen unsatisfactory for good quality television reception, and looked like the force lines traced by a myriad of tiny iron filings in an inhomogeneous magnetic field.

With the foregoing in mind, one of the objects of my invention is to provide an improved method and means for making a fluorescent screen of the character referred to which has a light efficiency substantially greater than that of the screens made heretofore, and which also has the same advantages as the latter in the way of uniformity and durability.

Another object of my invention is to provide an improved method and means of making fluorescent screens by the method referred to, the settling solution for this purpose having substantial advantages over those used heretofore in the way of having a substantially lower viscosity, a substantially higher surface tension, and being chemically inert with respect to the fluorescent material, the glass on which the material is deposited, and the silver coating on the interior surface of the glass when this is present.

Another object of my invention is to provide a novel combination of a settling liquid and particles of fluorescent material for the purpose aforesaid, the settling liquid having special characteristics and being capable of exerting a cooperative influence with respect to the particles as they settle to permit the individual particles to settle along substantially straight paths vertically to produce a uniform screen, although the size of the particles is substantially smaller than before for the purpose of obtaining a fluorescent screen with a light efficiency substantially greater than the screens made heretofore.

Other objects and advantages will hereinafter appear.

In accordance with my invention, I employ fluorescent particles which are as small or even smaller than those which can pass through a 400 mesh screen, and place these particles in suspension in a solution of an electrolyte, such as a solution of ammonium carbonate, carbamate hereinafter called simply "ammonium carbamate", or a solution of ammonium carbonate, or a carbonic acid solution; after which the operation is carried on as before.

My invention resides in the improved method and means of the character hereinafter described and claimed.

In the drawing, Figure 1 is an elevational sectional view of a blank for a cathode ray tube, showing the manner in which the fluorescent material is applied to the end wall; and Fig. 2 is a schematic view, illustrative of the principle or phenomena involved in the carrying out of my improved method.

In carrying out my invention, a fluorescent material such as willemite is ground until the particles are very small, and sufficiently so that they will pass through a 400 mesh screen, for example. The particles of fluorescent material are then placed in suspension in a special settling solution. In this connection, satisfactory results have been obtained by using 100 to 150 grams of ammonium carbamate or of ammonium carbonate to each 10 grams of willemite.

The effect of the ammonium carbamate is to supply enough light weight ions, of relatively high mobility, to discharge static charges which tend to accumulate on the willemite particles. The principle of operation is illustrated schematically in Fig. 2, wherein the reference numeral 10 designates the settling liquid covering the end wall 12 of a tube blank 14 to a small depth and containing particles of fluorescent material which have been shaken into homogeneous distribution throughout the liquid, and which are in the act of settling upon the wall 12 under the influence of gravity. Two of these particles are represented at 16 and 18, and their size is assumed to be of the order of those which will pass through a 400 mesh screen. There is a substantial difference between the sizes of some of the particles, and this condition is represented in Fig. 2, the particle 18 being represented as being substantially smaller in size than the particle 16. The size of the individual particles is so small that the action is substantially the same as that for pseudo-colloids. That is, the physical principles of colloidal phenomena apply as the particles settle. According to the important empirical law of colloid physics deduced in the year 1898 by Cohen, if a colloidal dispersion consists of two dielectrics the substance having the greater dielectric constant loses electrons, and therefore charges itself positively with respect to the substance of lower dielectric constant. The dielectric constant of water has been found to be 80, and that of willemite ($Zn_2SiO_4BaMn$) has been found to be 15. For this reason, and assuming for the time that the settling liquid is pure water, as the particles such as 16 and 18 settle, the molecules of water immediately adjacent them lose electrons and take on positive charges, as represented by the plus (+) signs in Fig. 2. The electrons lost by the water molecules pass to the particles 16 and 18 so that they take on negative charges, as represented by the negative (—) signs in Fig. 2. The larger particles of willemite will take on a greater negative charge than the smaller particles. The respective adjacent particles of willemite with their different negative charges will repel each other, and the repelling forces between adjacent particles at one point will accordingly be substantially different than those forces between adjacent particles at another point. Due to the difference in the negative charges referred to, and taking two vertical columns "$a$" and "$b$" of the liquid, for example, with the willemite particles in suspension the difference in the negative charges on the individual particles in the two columns will cause the particles to settle along zig-zag paths rather than along straight paths vertically to the surface of the end wall 12. The result of this action is seen in the screen which is left on the end wall 12 after all of the particles have settled thereon, and the tube blank 14 has been rotated slowly through the angle $x$ to a position whereat the supernatant liquid is decanted. That is, the screen will look like the force lines traced by a myriad of tiny iron filings in a non-homogeneous magnetic field, the irregularities in the screen being sufficient to make it unsatisfactory for television reception purposes.

The above action takes place in using pure water for the liquid, as heretofore, and when the fluorescent particles are made so small that the physical principles of colloidal phenomena apply. The action is changed as follows by practicing my invention. In this connection, I propose to add ammonium carbonate, carbamate $$(NH_4HCO_3NH_4NH_2CO_2)$$

because of its characteristic of high solubility which gives a high surface tension, and the characteristic of high dissociation constant, namely, greater than $10^{-10}$, without the disadvantage of explosive qualities. Due to the high dissociation constant of the ammonium carbamate, enough high-mobility ions are yielded in solution to discharge the negatively charged willemite particles at a rate sufficiently fast to remove the charges and permit the particles to follow a substantially straight path vertically as they settle. It is proposed to add ammonium carbamate in such amount as to approximate the isoelectric point for the suspension.

A specific settling solution made in accordance with my invention contains 0.010 gram/ml. of willemite ($Zn_2SiO_4BaMn$) and 0.125 gram/ml. of ammonium carbonate, carbamate $$(NH_4HCO_3NH_4NH_2CO_2).$$

The solution is kept in a clean, Pyrex, glass-stoppered bottle at 2–4° C. The aqueous ionic reactions have been determined to be as follows:

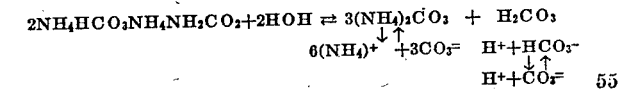

From the reaction as expressed above, it will be seen that the ammonium carbamate molecules dissociate into positive ammonium ions, positive hydrogen ions and negative carbonate ions. The positive hydrogen ions neutralize or discharge negative charges which would otherwise be taken on by the particles of willemite, and the negative carbonate ions neutralize or discharge positive charges which would otherwise be taken on by the water molecules. The forces which would otherwise be applied to the individual particles to cause them to settle along a zig-zag or irregular path are removed in this way and the individual particles, accordingly, settle along a straight vertical path, except as influenced by Brownian movement, upon the end wall 12 to form a uniform screen.

The various liquids, such as water, used heretofore as a settling liquid do not have an equivalent cooperative influence with respect to the very fine particles of fluorescent material because of their relatively low dissociation constants. That is, the amount of any ions yielded by these liquids is far less than that required to adequately discharge the interfering charges developed as the particles settle down through the liquid. The interfering forces, due to the fact that the physical principles of colloids apply, are therefore permitted to develop as explained, and to cause the very fine particles to settle irregularly and produce a non-uniform screen.

In lieu of using ammonium carbamate or ammonium carbonate in the manner and for the purpose explained, it is proposed to saturate the water with carbonic acid by means of carbon dioxide ($CO_2$) ("Dry Ice"). Complete saturation has given satisfactory results with the temperature relatively low and the $CO_2$ pure and oil-free. The reaction in this case is as follows:

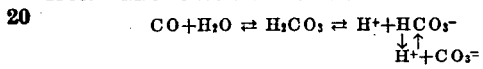

The reaction yields enough high-mobility ions to discharge the negatively charged willemite particles as fast as these charges are taken on by the particles as they settle or fall through the solution.

From the foregoing it will be seen that I have provided an improved method and means for applying a uniform fluorescent screen to a base member, such as the end wall of a tube blank, to permit the individual particles to settle along straight vertical paths to form a uniform screen, although they are so small that the physical principles of colloidal phenomena apply. Since the sizes of the particles are substantially less than that of those used heretofore, the light efficiency of the screen is substantially greater than that of those made according to the prior method referred to. The electrolytic settling solution used in accordance with my invention not only has the capability of the cooperative influence explained with respect to the very fine fluorescent particles, but it is chemically inert with respect to the particles, the glass surface and the silver coating when this is present, and has advantages over the settling liquids used heretofore in the way of higher surface tension and lower viscosity.

It will be understood that various modifications, within the conception of those skilled in the art, are possible without departing from the spirit of my invention or the scope of the claims.

I claim as my invention:

1. The method of applying a fluorescent screen to a base member therefor, comprising placing in a low viscosity, high surface tension electrolyte solution separate nonaggregate particles of fluorescent material which may be shaken into homogeneous distribution throughout the solution and which will then settle under the influence of gravitational force, said solution being non-reacting with respect to the material, the size of the individual particles being such that their distribution throughout the solution would be influenced substantially in accordance with the physical principles of colloidal phenomena, the solution being characterized by the fact that the ionic dissociation constant of the electrolyte is greater than $10^{-10}$ whereby the dissociated ions are effective to substantially remove the influence of the physical principles of colloidal phenomena with respect to electrical charging of the particles as they settle, and permitting the particles to settle upon and attach themselves to the base member to form thereon a uniform fluorescent screen.

2. The combination of particles of fluorescent material in a low viscosity, high surface tension electrolyte solution, said solution being non-reactive with respect to the material, characterized by the fact that the individual particles can settle out of the solution under the influence of gravitational force, by the fact that the combination has the properties as determined by the physical principles of colloidal phenomena, and by the fact that the ionic dissociation constant of the electrolyte is greater than $10^{-10}$.

3. A pseudo-colloidal solution of fluorescent material in a high surface tension, low viscosity highly dissociated electrolyte, said electrolyte being non-reactive with said materials.

4. The step in the method of preparing luminescent screens by settling luminescent materials upon a supporting area from a suspension solution which comprises suspending particles of luminescent material in a saturated aqueous carbonic acid solution.

5. The step in the method of preparing luminescent screens by settling luminescent materials upon a supporting area from a suspension solution which comprises suspending particles of luminescent material in an isoelectric solution of ammonium carbonate, carbamate.

6. The step in the method of preparing luminescent screens by settling luminescent materials upon a supporting area from a suspension solution which comprises suspending particles of luminescent material in an isoelectric solution of ammonium carbonate.

7. The step in the method of preparing luminescent screens by settling luminescent materials upon a supporting area from a suspension solution which comprises ionically neutralizing the electric charge induced upon the material in suspension during settling.

8. The method of eliminating spurious electric charging effects upon minute particles in fluid suspension, comprising the step of rapidly equalizing charging inequalities of the particles in the suspension by mobile ionic carriers.

HUMBOLDT W. LEVERENZ.